United States Patent [19]
Shimizu et al.

[11] 3,884,992
[45] May 20, 1975

[54] THERMOSETTING RESIN CONTAINING EPOXY RESIN AND POLYHYDROXYSTYRENE

[75] Inventors: Masaru Shimizu, Kanagawa; Hiroshi Fujiwara, Saitama; Shinji Iwai, Kanagawa, all of Japan

[73] Assignee: Maruzen Oil Co., Ltd., Tokyo, Japan

[22] Filed: Nov. 1, 1973

[21] Appl. No.: 411,874

[30] Foreign Application Priority Data
Nov. 1, 1972  Japan.............................. 47-109675

[52] U.S. Cl............ 260/837 R; 161/186; 260/2 EP; 260/18 EP; 260/23 EP; 260/30.6 R; 260/31.2 R; 260/32.8 EP; 260/32.4 R; 260/33.2 EP; 260/33.4 EP; 260/37 EP; 260/47 EP; 260/42.28; 260/836
[51] Int. Cl............................................ C08g 45/04

[58] Field of Search....... 260/836, 837, 2 EP, 47 EP

[56] References Cited
FOREIGN PATENTS OR APPLICATIONS
676,534    1/1963   Canada
46-21213   6/1971   Japan Primary Examiner—Paul Lieberman
Attorney, Agent, or Firm—Sughrue, Rothwell, Mion, Zinn and Macpeak

[57] ABSTRACT

Thermosetting resin compositions comprising polyhydroxystyrene and an epoxy resin and which can be changed into hardened products having excellent heat resistance. In the hardening of the thermosetting resin compositions under heat, no catalyst or hardening accelerator are needed and hardened products having excellent heat resistance can be obtained therefrom.

17 Claims, No Drawings

THERMOSETTING RESIN CONTAINING EPOXY RESIN AND POLYHYDROXYSTYRENE

BACKGROUND OF THE INVENTION

1. Field of the Invention

The present invention relates to new resin compositions comprising polyhydroxystyrene and an epoxy resin and, in particular, to resin compositions which can be changed into hardened products having excellent heat resistance as well as to a method for hardening the resin compositions.

2. Description of the Prior Art

Heretofore thermosetting resin compositions comprising an epoxy resin and a phenol precondensate have been utilized in various fields such as paints and varnishes, castings, as well as in laminates and other composite articles. However, it is in general difficult to harden the epoxy resin and phenol precondensate compositions without the use of a catalyst or hardening accelerator. In addition, the resulting hardened products have limited heat resistance and cannot be used in fields which require heat resistance. Thus, these epoxy resin-phenol precondensate compositions are defective, particularly with respect to the heat resistance of the hardened products obtained therefrom. For example, with respect to a composition consisting of a mixture of a phenol-novolak having a melting point of 60° to 170°C and a bisphenol A type epoxy resin having an epoxy equivalent of 189 (as used in this specification, the term "epoxy equivalent" means "molecular weight/number of epoxy groups" per molecule), even though the composition is heated to 150°C, only formaldehyde is generated and the hardening thereof does not proceed. Even if the heating is continued for 20 hours under these conditions, the viscosity of the composition merely increases somewhat. This composition becomes a hardened product only by heating the same composition with the addition of a catalyst such as a tertiary amine catalyst or a hardening accelerator, and the heat resistance of the resulting hardened product is limited to only about 100°C or so, for example, with respect to heat deformation temperature.

SUMMARY OF THE INVENTION

A first object of the present invention is to provide resin compositions which can be changed into hardened products having excellent heat resistance.

A second object of the present invention is to provide resin compositions which can be changed into hardened products having excellent heat resistance without the use in the heat-hardening of any catalyst or hardening accelerator.

A third object of the present invention is to provide thermosetting resin compositions of less toxicity.

A fourth object of the present invention is to provide thermosetting resin compositions which are particularly suitable for the preparation of copper clad laminates.

The compositions of the present invention comprise polyhydroxystyrene and an epoxy resin.

DETAILED DESCRIPTION OF THE INVENTION

The polyhydroxystyrene used in the compositions of the present invention can be a polyhydroxystyrene of various degrees of polymerization over a broad range of from tetramers to polymers having a degree of polymerization of about 70,000, the degree of polymerization is preferably in the range of from about tetramers to polymers of a degree of polymerization of about 150 or so. If lower than a tetramer, a composition containing such lower polymer can often be changed into a hardened product of excellent heat resistance only with difficulty. On the contrary, if the polymer has a degree of polymerization higher than about 70,000, the melting point thereof is too high and such a polymer is difficult to melt with the result that hardened products of homogeneous quality can only be obtained therefrom with difficulty. The monomer unit can be anyone of o-hydroxystyrene, m-hydroxystyrene and p-hydroxystyrene as well as mixtures thereof. These polyhydroxystyrenes can easily be prepared, for example, by thermal polymerization, ionic polymerization or radical polymerization of these hydroxystyrene monomers, or can also easily be prepared by polymerizing an acyloxystyrene or an alkoxystyrene and then hydrolyzing the resulting polymers.

The epoxy resins used with the polyhydroxystyrene can be anyone of the so-called epoxy resins which are generally used and which mainly comprise compounds having at least two epoxy groups per molecule. These epoxy resins can further be anyone of the saturated or unsaturated aliphatic, cycloaliphatic, aromatic or heterocyclic epoxy resins, and if desired, can be substituted by one or more substituents which have no influence on producing and hardening the composition, such as a halogen atom, a hydroxyl group, an ether group, an ester group and/or a metal atom.

Representative examples of preferred epoxy resins are, for example, the following compounds:

1. Polyglycidylethers obtained by etherification of polyhydric alcohols or polyhydric phenols with epichlorohydrin or dichlorohydrin in the presence of alkaline agents, which include glycidylethers (bisphenol type epoxy resins) derived from bis-(p-hydroxyphenyl)-methane, bis-(p-hydroxyphenyl)-dimethylmethane, bis-(p-hydroxyphenyl)-methylphenylmethane, bis-(p-hydroxyphenyl)-tolylmethane, 4,4'-dihydroxy-diphenyl, bis-(p-hydroxyphenyl)-sulfone, etc.; glycidylethers (polyhydroxybenzene type epoxy resins) derived from resorcin, catechol, hydroquinone, etc.; glycidylethers (polyphenol type epoxy resins) derived from 1,1,3-tris-(p-hydroxyphenyl)-propane, 1,1,2,2-tetrakis-(p-hydroxyphenyl)-ethane, 1,1,5,5-tetrakis-(p-hydroxyphenyl)-pentane, etc.; glycidylethers (novolak or resole type epoxy resins) derived from novolaks or resoles or the like produced by the condensation of phenol and formaldehyde; and glycidylethers (polyglycol type epoxy resins) derived from ethylene glycol, diethylene glycol, triethylene glycol, 1,3-propylene glycol, 1,4-butylene glycol, 1,5-pentane-diol, 1,6-hexane-diol, 2,4,6-hexane-triol, glycerin, etc.

2. Polyglycidyl esters (carboxylic acid type epoxy resins) formed by the reaction of polycarboxylic acids with epichlorohydrin or dichlorohydrin in the presence of alkaline agents; These polyesters are derived, for example, from aliphatic dicarboxylic acids such as succinic acid, adipic acid, etc.; aromatic dicarboxylic acids such as phthalic acid, terephthalic acid, etc.; or polymers of unsaturated fatty acids, such as linoleic acid, etc.

3. Cycloaliphatic polyepoxides (cycloaliphatic type epoxy resins) such as vinyl cyclohexenedioxide, limonenedioxide, dicyclopentadienedioxide, ethyleneglycol-bis-(3,4-epoxy-tetrahydro-dicyclopentadiene-8-yl)-ether, (3,4-epoxy-tetrahydrodicyclopentadien-8-yl)-glycidylether, diethyleneglycol-bis-(3,4-epoxy-cyclohexanecarboxylate), bis-(3,4-epoxy-cyclohexylmethyl)-succinate, 3,4-epoxy-6-methylcyclohexylmethyl-3,4-epoxy-6-methylcyclohexane-carboxylate, 3,4-epoxy-hexahydrobenzal-3,4-epoxy-cyclohexane-1,1-dimethanol, etc.

4. Basic polyepoxy compounds (nitrogen-containing epoxy resins) obtained by the reaction of aliphatic or aromatic primary or secondary diamines such as aniline, toluidine, 4,4'-diamino-diphenylmethane, 4,4'-di-(monomethylamino)-diphenylmethane, 4,4'-diaminodiphenylsulfone, etc. with epichlorohydrin in the presence of alkaline agents.

5. (Dienetype epoxy resins) such as epoxidized dienes, epoxidized polybutadiene or epoxidized copolymers of butadiene and ethylenically unsaturated compounds such as styrene or vinyl acetate with butadiene, etc.

In the present invention, mixtures of these epoxy resins can be used.

Of these epoxy resins, the bisphenol type epoxy resins are preferably used, since various kinds of these resins having various molecular weights are readily available and further the applications of these bisphenol epoxy resins is extremely broad.

The composition of the present invention comprises a homogeneous mixture of polyhydroxystyrene and epoxy resin, and the polyhydroxystyrene and the epoxy resin can be employed together in any desired ratio depending on the desired end uses. In the composition, however, if the ratio of the number of hydroxyl groups contained in polyhydroxystyrene to the number of epoxy groups contained in epoxy resin (herein referred to as the "hydroxyl group/epoxy group ratio") is too great, the hardened product obtained from the composition is a thermoplastic one, being less crosslinked, with the result that the physical properties of the resulting hardened product are not greatly different from the properties of the polyhydroxystyrene used. If, on the contrary, the hydroxyl group/epoxy group ratio is too small, the hardened product obtained from such a composition also is a thermoplastic one, and in the latter case, the physical properties of the resulting hardened product are not greatly different from the properties of an epoxy resin used. Accordingly, in the constitution of the present composition, the hydroxyl group/epoxy group ratio is preferably in the range of $\overline{P}/5 \sim 0.6$ (where $\overline{P}$ represents an average degree of polymerization of polyhydroxystyrene used), and it is desirable to appropriately select this ratio in this range depending on the desired end use. For example, in a composition comprising a bisphenol A type epoxy resin having an epoxy equivalent of about 200 or so and a polyhydroxystyrene having an average degree of polymerization of about 65 or so, if special importance is attached to imparting heat resistance to the hardened product obtainable, the hydroxyl group/epoxy group ratio is preferably in the range of 0.8–5.0 or so. Outside this range, the hardened product obtainable is insufficiently crosslinked with the result that the heat resistance thereof tends to be reduced.

The compositions of the present invention can be in various forms or phases. That is, the composition of the present invention can be a liquid or a solid, depending upon the phases of the polyhydroxystyrene and the epoxy resin used in the composition. In addition, the composition can be in the form of a solution in an organic solvent, e.g., at a concentration of about 3 to 95 percent by weight, which dissolves both the polyhydroxystyrene and the epoxy resin but which does not react therewith. Suitable solvents are, for example, ketones such as acetone, methyl ethyl ketone and methyl isobutyl ketone, esters such as methyl acetate, ethyl acetate, butyl acetate and amyl acetate, ethers such as tetrahydrofuran and dioxane, etc. The composition of the present invention can further contain various kinds of dyestuffs and pigments as well as various kinds of adjuvants such as plasticizers, reinforcing agents, fillers, etc.

Conventional plasticizers can be used in the present invention. Suitable examples are glycerin, nitrobenzene, phthalic anhydride, benzoic anhydride, stearic acid, stearates, dibutylphthalate, tricresylphosphate, alkylphenols, alkyldiphenyl benzene, rosin, etc. An amount of the plasticizer employed is generally 0.5 to 20 wt percent based on the weight of the resin composition.

Conventional reinforcing agents can be used in the present invention. Suitable examples of these reinforcing agents are papers, asbestos papers, synthetic fibers, glass fibers, graphite fibers, metallic fibers, etc. An appropriate amount of the reinforcing agent used is 20 to 900 phr. based on the weight of the resin composition.

Conventional fillers can also be used in the present invention. Suitable examples of such are silicas, quartz, aluminas, calcium carbonate, mica, talc, graphite, cements, clays, asbestos, gypsum, metallic powders etc. An amount of the filler used is less than 900 phr based on the weight of the resin composition.

The present composition can be hardened generally by heating at a temperature of about 150°C or more for 10 minutes to 4 hours. In order to reduce the hardening time and to effectively attain the characteristic properties of the hardened product such as excellent heat resistance, it is preferable to heat at about 180° to 250°C. Higher hardening temperatures can be employed up to below the decomposition temperature of the resulting hardened product (generally about 310° to 390°C).

The compositions of the present invention can be hardened simply by heating without the use of any catalyst or hardening accelerator. However, where desired it is also possible to reduce the heating time or to lower the heating temperature by adding to the composition a catalyst or hardening accelerator generally used for the hardening of epoxide-phenol type compositions, for example, a secondary amine such as urea or diethanol amine, a tertiary amine such as triethanol amine, p-dimethylaminobenzaldehyde or N,N-dimethylformamide, or the like. The amount of the hardening accelerator or catalyst added can be equal to or less than that added to conventional epoxide-phenol type compositions, e.g., generally an amount of accelerator or catalyst of 0.1 to 10 phr.

The compositions of the present invention can be widely used in various fields such as coating agents, moldings as well as laminates and other composite articles, and the compositions can be utilized in various forms. For example, a solution the present composition dissolved in an appropriate solvent is applied on a support, dried at a temperature of about room temperature (20°–30°C) to about 140°C, preferably room temperature to about 100°C and heated at the temperatures described above, or powders of the present composition are applied on a support by compression and heated, whereby a smooth film is formed on the support. As another embodiment, the composition of the present invention can be cast in a mold, directly heated and melted at a temperature below the hardening temperature of the composition and then the cast melt is heated at the hardening temperature thereof to obtain a casting. In a still another embodiment for manufacturing composite articles using the compositions of the present invention, the composition is, in general, first applied at a temperature below the hardening temperature thereof and then melted and hardened or is first dissolved in an organic solvent, and the resulting solution is impregnated into a reinforcing material such as organic fibers, graphite fibers, asbestos, slag wool or the like, and when the solution is used the organic solvent used is removed by evaporation after the impregnation, whereby an impregnated product such as a so-called bulk-molding compound, sheet-molding compound, prepreg mat or the like is obtained. the impregnated products thus obtained are free from any defect such as blocking which occurs at room temperature due to the adhesion thereof, as is seen in other impregnated products in the formation of composite articles using polyester resins, and further the impregnated products of the present invention have excellent storage stability. That is, the impregnated products obtained from the compositions of the present invention are advantageous since they can be easily handled. Next, the resulting impregnated product is put into a mold using any appropriate method depending upon the form or shape thereof and compressed and heated to harden the resin composition, whereby a composite article reinforced with the reinforcing material used is obtained. In this heat treatment, it is sufficient to heat the impregnated product to the above mentioned temperature to harden the composition of the present invention, and it is desirable to mold under compression at about 170° to 180°C for 1 hour and then to further post-cure at about 180° to 250°C for about 2 to 3 hours. In the manufacture of composite articles according to the present invention, an inorganic filler or a like additive can of course be used in a manner analogous to the manufacture of reinforced plastics in general.

The compositions of the present invention have a variety of uses and can be easily hardened simply by heating without the use of any catalyst or hardening accelerator, and the resulting hardened products have excellent heat resistance as will be concretely substantiated in the examples to follow. For example, when castings are manufactured from the compositions of the present invention they have a high heat deformation temperature, and when composite articles are prepared from the present compositions with heat resistant reinforcing materials, the strength thereof is not lowered even after heating for a long period of time and the hot strength thereof is fully maintained at a high level. Conventional thermosetting resin compositions of epoxy resins and phenol precondensates are not fully hardened without a catalyst or hardening accelerator, and, even though these conventional compositions are hardened with these agents, the resulting hardened products do not have the excellent heat resistance of the hardened products obtained from the compositions of the present invention.

Another advantage of the present invention is the ability to provide epoxy-containing resin compositions of extremely low toxicity. In general, known epoxy resin compositions are toxic, and various precautions have been taken therefor during the manufacture and processing of these known epoxy resin compositions. Apart from the toxicity of epoxy resins themselves contained in these compositions, it is well known that the toxicity of these compositions most greatly depends upon the toxicity of hardeners. In particular, amines which are predominantly used as hardeners or accelerators are extremely toxic, and in addition, it has been reported that acids, acid anhydrides, phenol resin precondensates, etc., which are used as hardeners have some degree of toxicity. Although it would have been predicted that the polyhydroxystyrene used in the composition of the present invention would be toxic since it is a phenol type compound, it has surprisingly been found after a great deal of experimentation on the toxicity thereof that the polyhydroxystyrene does not have any acute or sub-acute toxicity and further does not exhibit any toxicity in a skin stimulation effect test. Accordingly, the use of non-toxic polyhydroxystyrene as one component of resin compositions in the present invention is very advantageous in that not only are the precautions necessary in the preparing operation of the compositions decreased but also the toxicity of the prepared compositions themselves is greatly reduced due to the use of this non-toxic compound.

Results of Toxicity Determination on Polyparahydroxystyrene

| Acute and Sub-acute Toxicity Test | Test Animal | Dose | Results |
| --- | --- | --- | --- |
| Single Dosage by Peroral Administration | Mouse | 1000 mg/kg | i) Increasing degree of weight was normal for 2 weeks.<br>ii) No abnormal symptoms were found in internal organs on dissection thereof after 1 hour as well as after 24 hours.<br>iii) Also no abnormal symptoms were found in internal organs on dissection thereof after 15 days. |
| | Rat | 500 mg/kg | i) Symptoms were almost same as those of control animals.<br>ii) No abnormal symptoms were found in internal organs on dissection thereof after 2 weeks. |

Results of Toxicity Determination on Polyparahydroxystyrene

| Acute and Sub-acute Toxicity Test | Test Animal | Dose | Results |
|---|---|---|---|
| Continuous Dosage by Peroral Administration | Rat | 500 mg/kg | i) Increasing degree of weight somewhat lowered, but this difference was not significant.<br>ii) No abnormal symptoms were found in internal organs on dissection thereof after 1 week. |
| Single Dosage by Hypodermatic Administration | Mouse | 10,000 mg/kg | i) No abnormal symptoms were found in internal organs on dissection thereof after 15 days as well as after 1 month. |
|  | Rat | 500 mg/kg | i) Increasing degree of weight somewhat lowered.<br>ii) No abnormal change was found in internal organs in dissection test thereon after 1 month. |
| Skin Stimulation Effect by Single Application | Test Animal | applied or dropped part | Results |
| Local Stimulation by Single Application | Guinea Pig | back with hair removed | i) Dye permeability was not accelerated. |
| Single Dropping or Application | Guinea Pig | eyes | i) Reflex restraining effect was not observed in each case. |
| Continuous Application | Guinea Pig | back with hair removed | i) No visible abnormalies were found after 15 days<br>ii) With respect to hypodermatic blood vessels in back, no abnormal symptoms such as concentration of blood vessels were observed after 15 days.<br>iii) Acceleration of dye permeability was not admitted. |
|  |  | ears | i) Although some enlargement of blood vessels was noticed which is considered to be due to physical stimulation, no other abnormal symptom was found. |
|  |  | eyes | i) Eyeball-conjunctivas, eyelid-conjunctivas etc. were not bloodshot.<br>ii) No tearing and no abnormal symptoms were noticed in corneas and irises. |

The resin compositions of the present invention are suitable for use as insulating materials, particularly copper clad laminates for use as printed circuits (hereunder simply referred to as CCL), used in the electric and electronic industries. Paper/phenol resin CCL's prepared by high pressure molding has heretofore occupied almost all CCL of these fields, but the paper/phenol resin CCL is defective in that the electrical properties thereof widely fluctuate depending upon variations in ambient temperature and humidity, with the result that the laminate tends to warp extensively due to heating and moisture absorption, causing a poor operation of the device due to an incomplete contact of the laminate with other part, and in that the laminate has poor heat resistance in solder immersion and poor chemical resistance.

under such circumstances, the use of an improved glass fabric/epoxy resin CCL, which is free from these defects, has been greatly required and has increased in recent years. In addition, a further improved CCL of higher heat resistance in soldering has now been required for the purpose of improving further the efficiency in soldering step. A CCL prepared by using a substrate impregnated with the composition of the present invention has higher heat resistance in soldering.

The manufacture of a substrate impregnated with the composition of polyhydroxystyrene and epoxy resin of the present invention can be by applying conventional techniques which have heretofore been employed in preparing conventional synthetic resin impregnated substrates, for example, phenol resin impregnated substrates, epoxy resin impregnated substrates, etc. More precisely, substrates impregnated with the above described resin compositions are prepared, for example, employing the following steps: The components of the resin composition to be impregnated are dissolved and the components, that is, both the polyhydroxystyrene and the epoxy resin, are dissolved in a solvent which does not react with the components. Suitable solvents which can be employed, for example, ketones such as acetone, methyl ethyl ketone and methyl isobutyl ketone, esters such as methyl acetate, ethyl acetate, butyl acetate, ethers such as tetrahydrofuran and dioxane, etc. Then the resulting varnish is impregnated into a heat resistant substance such as paper, glass fabric, asbestos paper or a like substrate, and the thus impregnated substrate is dried at a temperature in a range such that the impregnated polyhydroxystyrene-epoxy resin composition is not as yet completely hardened. The concentration of the resin composition in the impregnating varnish is appropriately selected depending on the degree of the content of the resin composition in the resin composition impregnated substrate, and is preferably in the range of about 10 to 80 percent by weight. The content of the resin composition in the resin composition impregnated substrate also is preferably in the range of about 10 to 80 percent by weight. The drying temperature of the resin composition impregnated substrate can be at any temperature which does not completely harden the resin composition, as mentioned above. In general, a suitable temperature is in the range of from about room temperatures (20° to 30°C) to 140°C. When a catalyst or a hardening accelerator is used for the purpose of accelerating the hardening of the resin composition, this additive is generally incorporated in the impregnating varnish during the preparation thereof.

As the copper foil to be used for the preparation of CCL of the present invention, any copper foil which has heretofore been manufactured and is commercially available for an epoxy resin CCL can be used as such, or if necessary, after an adhesive is applied thereon. Suitable adhesives which can be used are heat resistant thermosetting resins other than polyhydroxystyrene-epoxy resin compositions used in the preparation of the synthetic resin impregnated substrates in the present invention, such as a mixture of a novolak epoxy resin and an amine hardener or the like. It is preferred to use as the adhesive a varnish of the above described polyhydroxystyrene-epoxy resin composition for the purpose of fully exhibiting the excellent characteristics of the polyhydroxystyrene-epoxy resin composition itself in the CCL.

The shaping of the above described CCL can generally be carried out using the same methods as are employed in shaping conventional CCL's. For example, an appropriate number of the above described polyhydroxystyrene-epoxy resin composition impregnated substrates are piled depending on the thickness of the CCL desired, a copper foil which has or has not been treated with an adhesive is superposed on one surface or both surfaces of the laminated substrate so that the adhesive surface of the copper foil is in contact with the substrate, and highly polished plates are placed on both the upper and lower surfaces thereof. The thus placed substrate is put between press-heat plates and is shaped there between under heat and pressure. The heating and pressing conditions are preferably a temperature of about 120° to 250°C and a pressure of about 10 to 80 kg/cm$^2$ for the heating and a pressing time of about 10 minutes to 2 hours. It is especially preferred to post-cure for about 1 to 24 hours at about 150° to 250°C after shaping. In addition, it is also possible to shape a CCL by placing a polyhydroxystyrene-epoxy resin composition impregnated substrate between a previously prepared laminate and a copper foil which has been treated with an adhesive or not treated with an adhesive and then heating and pressing under the above described conditions. In the last case, the previously prepared laminate may be one shaped by heating and pressing an appropriate number of the polyhydroxystyrene-epoxy resin composition impregnated substrates used in the present invention, or may be any other commercially available thermosetting resin laminates.

A CCL prepared by using the resin composition of the present invention has particularly excellent solder heat resistance. Regarding a conventional glass/epoxy resin CCL, the approximate limit of the solder heat resistance thereof is that no blister or peeling occurs under the conditions of 260°C for 120 seconds. Whereas, CCL's prepared by using the resin compositions of the present invention have surprisingly higher solder heat resistance than the conventional CCl such that no change is noticed therein at 260°C for 30 minutes or more, or in particular, at 300°C for 30 minutes or more by appropriately selecting the components of the resin compositions, as seen in the Examples 9 and 13 to follow. In addition, the peeling strength (on peeling of the copper foil) of the present CCL after the soldering test is not substantially different from (or is almost the same as) that before the test, that is the adhesion of the copper foil is essentially the same before and after the soldering test. In addition, it further is possible to improve somewhat the peeling strength (or adhesion) of the CCL after the soldering test than before the test, as shown in Example 9 to follow.

Now, the present invention will be explained in greater detail by reference to the following Examples. Unless otherwise indicated, all parts and percents are by weight.

EXAMPLE 1

Polyparahydroxystyrene having an average molecular weight of 8000 and a bisphenol type epoxy resin DER331-J (trade name, a resin consisting of bisphenol A and epichlorohydrin and having an epoxy equivalent of 189, produced by the Dow Chemical Co.) or a peracetic acid type cycloaliphatic epoxide CX 221 (trade name, an epoxy resin having an epoxy equivalent of 137, produced by the Chisso Co.) were admixed together so that the hydroxyl group/epoxy group ratio (—OH/Ep) is 0.8, 1.3, 1.8 or 2.3, and the resulting mixture was heated and melted at 150° to 170°C. The resulting melt was cast into a glass mold (to which is applied a silicone grease as a releasing agent) and heated at 150°C for 1 hour, and then further heated at 180°C for 3 hours, after removal from the glass mold, thereby to obtain a casting of a transparent pale yellow color. Testing pieces cut from the obtained casting were subjected to a heat deformation test to determine the heat deformation temperature (HDT) thereof, and the test results obtained are shown in Table 1 below.

The structure of the above described peracetic acid type cycloaliphatic epoxide is as follows:

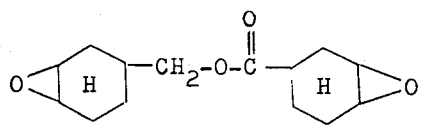

Table 1

| Test No. | PHS (wt%) | Epoxy Resin (wt%) CX 221 | DER 331-J | —OH/Ep | HDT (°C) |
|---|---|---|---|---|---|
| 1 | 41.2 | 58.8 | — | 0.8 | 140.5 |
| 2 | 53.2 | 46.8 | — | 1.3 | 151 |
| 3 | 61.2 | 38.8 | — | 1.8 | 175 |
| 4 | 66.8 | 33.2 | — | 2.3 | 174 |
| 5 | 45.2 | — | 54.8 | 1.3 | 132 |
| 6 | 53.3 | — | 46.7 | 1.8 | 157 |
| 7 | 59.4 | — | 40.6 | 2.3 | 160 |

EXAMPLE 2

Polyparahydroxystyrene having an average molecular weight of 2300 was used and the other components were the same as described in Example 1, whereby another type of casting was obtained. The heat deformation temperature of the resulting casting was measured in a manner similar to Example 1, and the results obtained are as follows:

Table 2

| Test No. | PHS (wt%) | Epoxy Resin (wt%) CX221 | DER331-J | —OH/Ep | HDT (°C) |
|---|---|---|---|---|---|
| 1 | 41.2 | 58.8 | — | 0.8 | 131 |
| 2 | 53.2 | 46.8 | — | 1.3 | 143 |
| 3 | 61.2 | 38.8 | — | 1.8 | 170 |
| 4 | 66.8 | 33.2 | — | 2.3 | 169 |
| 5 | 45.2 | — | 54.8 | 1.3 | 123 |
| 6 | 53.3 | — | 46.7 | 1.8 | 144 |
| 7 | 59.4 | — | 40.6 | 2.3 | 151 |

EXAMPLE 3

The same polyparahydroxystyrene as that described in Example 1 and DER331-J or CX221 as an epoxy resin were admixed together so that the hydroxyl group/epoxy group ratio was 2, and the resulting mixture was processed in the same manner as described in Example 1 with the exception that the heating conditions were variously changed as shown in the following Table 3, to obtain various types of castings. The heat deformation temperature of each of the castings obtained was measured in a manner similar to Example 1, and the results obtained are shown also in Table 3.

Table 3

| Test No. | Heating Condition | HDT (°C) DER331-J used* | CX221 used** |
|---|---|---|---|
| 1 | 150°C × 2 hr | 43 | 47 |
| 2 | 150°C × 1 hr (+ 180°C × 0.5 hr) | 108 | 133 |
| 3 | 150°C × 1 hr (+ 180°C × 1 hr) | 134 | 161 |
| 4 | 150°C × 1 hr (+ 180°C × 2 hr) | 151 | 172 |
| 5 | 150°C × 1 hr (+180°C × 3 hr) | 157 | 174 |
| 6 | 150°C × 1 hr (+ 180°C × 3 hr +200°C × 2 hr) | 162 | 179 |
| 7 | 150°C × 1 hr (+ 180°C × 3 hr +200°C × 10 hr) | 161 | 178 |

Remarks: In the column showing the heating conditions, the data set forth in parenthesis are the heating conditions used in post-curing.
* Constitution of composition (—OH/Ep = 2)
  PHS: 55.9 wt.%    DER331-J: 44.1 wt%
** Constitution of composition (—OH/Ep = 2)
  PHS: 63.7 wt%,    CX221: 36.3 wt%

EXAMPLE 4

The same polyparahydroxystyrene as that used in Example 1 and DER331-J were admixed together so that the hydroxyl group/epoxy group ratio was 1 or 2, and the resulting mixture was dissolved in methylethylketone to form a solution. The resulting solution was coated on a tin plate or a glass plate, and, after the thus coated plate was dried for 4 hours at room temperature, it was heat-treated for 1 hour at 180°C to form a coating film having a thickness of about 30μ. The thus formed film on a glass support was immersed in methylethylketone for 24 hours at room temperature or left for 6 hours in methylethylketone at reflux, and thereafter the degree of hardening of the film was observed. The other film on a tin plate support was subjected to a cross-cut peeling test, pencil hardness test and bending resistance test. The results of these tests are shown in the following Table 4. In the "Degree of Hardening" column in Table 4, the designation "O" means that the film was not eroded.

The bending resistance test in Table 4 was measured as follows: The bending resistance was measured using the following method according to JIS K 5400-1970 : A testing sample was applied to one surface of a tin plate (about 150mm×50mm×0.3mm) and the thus coated tin plate was inserted into a bending tester which is provided with a shaft having a determined diameter so that the coated surface was placed outside against the shaft, and then the plate was immediately bent around the shaft by 180° in the course of about 1 second. Afterwards, the bend area was observed by the naked eye to inspect any cracking or peeling of the coated film. In the Table 4 is given the minimum diameter of the shaft with which no abnormal phenomena such as cracking, peeling, etc. occured in the coated film.

Table 4

| Test No. | PHS (wt%) | DER331-J (wt%) | —OH/Ep | Degree of Hardening | | Cross-Cut* Test | Pencil Hardness Test | Bending Resistance Test (diameter of shaft) |
|---|---|---|---|---|---|---|---|---|
| | | | | Under Room Temperature | Under Reflux | | | |
| 1 | 38.9 | 61.1 | 1 | 0 | 0 | good | 2H | 8 mm |
| 2 | 55.9 | 44.1 | 2 | 0 | 0 | good | 3H | 10 mm |

* Material cross hatched, an adhesive tape applied and then peeled off.

EXAMPLE 5

The same polyparahydroxystyrene as that used in Example 1 and a bisphenol type epoxy resin DER664-J (a resin consisting of bisphenol A and epichlorohydrin and having an epoxy equivalent of 925, produced by the Dow Chemical Co.) were weighed out in such proportions that the hydroxyl group/epoxy group ratio was 1, 1.5, 2.0, 2.5 or 3.0, and these materials were pulverized with a pulverizer for 30 minutes and admixed together. Next, the resulting mixture was passed through a 65 mesh sieve and the part of the mixture passed was placed on a glass plate under compression in the thickness of about 100 μ and then heated at 120°C, 150°C or 180°C each for 2 hours to form a film thereon. The resulting film was immersed in methylethylketone for 24 hours at room temperature or left for 6 hours in methylethylketone at reflux and then the degree of hardening of the film was observed. In addition, the transparency of the film was also inspected. The results of these tests are shown in Table 5. In the "Degree of Hardening" column in Table 5, the designation "O" means that the film was not eroded, the designation "Δ" means that the film was partly eroded, and the designation "X" means that the film was dissolved.

shown in Table 6, and these materials were dissolved in acetone to form a solution. A glass cloth (a satin fabric of microglass ES-21NH produced by Nippon Glass Co.) was immersed in the solution, left at room temperature for 2 hours and dried for 10 minutes at 60°C and then for 20 minutes at 80°C. The thus obtained prepreg cloth had no adhesion at room temperature and may advantageously and effectively be dealt with. The above heat treatments do not cause any hardening reaction at all and the prepreg cloth obtained has high storage stability.

Next, 12 sheets of the prepreg cloths were piled with the warps thereof being aligned in the same direction, and then were subjected to hot-pressing at 180°C without pressure and then under a pressure of 20 kg/cm² for the period of time as shown in Table 6. The thus hot-pressed cloths were further post-cured at 180°C for 3 hours to obtain a laminate. The resulting laminate was free from any bubbles, which means that the present composition has good bubble removing ability.

The structure of the above vinylcyclohexanediepoxide is represented by the following formula:

Table 5

| Test No. | PHS (wt%) | DER664-J (wt%) | —OH/Ep | Heating Temperature (°C) | Degree of Hardening | | Transparency of Film |
|---|---|---|---|---|---|---|---|
| | | | | | Under Room Temperature | Under Reflux | |
| 1 | 11.5 | 88.5 | 1.0 | 120 | X | X | transparent |
| | | | | 150 | O | O | |
| | | | | 180 | O | O | |
| 2 | 16.3 | 83.7 | 1.5 | 120 | X | X | transparent |
| | | | | 150 | O | O | |
| | | | | 180 | O | O | |
| 3 | 20.6 | 79.4 | 2.0 | 120 | X | X | transparent |
| | | | | 150 | O | O | |
| | | | | 180 | O | O | |
| 4 | 24.5 | 75.5 | 2.5 | 120 | X | X | transparent |
| | | | | 150 | O | O | |
| | | | | 180 | O | O | |
| 5 | 28.0 | 72.0 | 3.0 | 120 | X | X | partly cloudy |
| | | | | 150 | O | Δ | |
| | | | | 180 | O | O | |

EXAMPLE 6

The same polyparahydroxystyrene as that used in Example 1 and DER331-J or CX206 (a vinylcyclohexenediepoxide having an epoxy equivalent of 76, produced by the Chisso Co.) were weighed in the ratio as

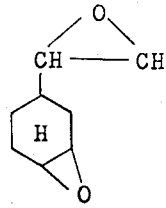

Table 6

| Laminate No. | PHS (wt%) | Epoxy Resin | | —OH/Ep | Hot-pressing Condition | |
|---|---|---|---|---|---|---|
| | | Kind | (wt%) | | 180°C Under Without Pressure (min.) | 180°C Under a Pressure of 20 Kg/cm² (min.) |
| 1 | 55.9 | DER331-J | 44.7 | 2 | 20 | 30 |
| 2 | 38.8 | do. | 61.2 | 1 | 30 | 30 |
| 3 | 24.1 | do. | 75.9 | 0.5 | 75 | 90 |
| 4 | 76.0 | CX206 | 24.0 | 2 | 5 | 30 |
| 5 | 61.2 | do. | 38.8 | 1 | 10 | 30 |
| 6 | 44.1 | do. | 55.9 | 0.5 | 10 | 30 |
| 7 | 63.7 | CX221 | 36.3 | 2 | 10 | 30 |

Test pieces (25 mm ×80 mm) were cut from each of the laminates obtained, and properties of these test pieces were tested under various conditions, with respect to weight loss, bending strength and bending elasticity. The results of these tests are shown in Tables 7 to 12.

Table 7

| Laminate No. | Weight Loss on Heating* | | | | | |
|---|---|---|---|---|---|---|
| | Air Oven Temperature: 200°C | | | Air Oven Temperature: 200°C | | |
| | 20 hr | 50 hr | 100 hr | 20 hr | 50 hr | 100 hr |
| 1 | 0.45 | 0.59 | 0.76 | 0.87 | 1.13 | 1.46 |
| 2 | 0.47 | 0.67 | 0.88 | 1.11 | 1.48 | 1.92 |
| 3 | 0.74 | 0.90 | 1.13 | 1.20 | 1.45 | 1.80 |
| 4 | 1.45 | 1.79 | 2.31 | 2.53 | 3.60 | 5.19 |
| 5 | 0.90 | 1.18 | 1.67 | 1.65 | 2.58 | 3.92 |
| 6 | 0.27 | 0.38 | 0.52 | 0.59 | 0.87 | 1.28 |
| 7 | 0.10 | 0.19 | 0.37 | 0.79 | 1.27 | 1.68 |

* The Test pieces were left in an air oven at 200°C or 250°C for the specific period of time set forth, and the weight loss of each piece was measured.

TABLE 8

Bending strength and bending elasticity under normal conditions

| Laminate No. | Bending Strength (kg/mm$^2$) | Bending Elasticity (kg/mm$^2$) |
|---|---|---|
| 1 | 46.5 | 1758 |
| 2 | 45.3 | 1776 |
| 3 | 43.9 | 1881 |
| 4 | 39.9 | 1789 |
| 5 | 38.4 | 1800 |
| 6 | 47.9 | 1872 |
| 7 | 45.3 | 1765 |

The method for measuring the bending strength and the bending elasticity was based on JIS K 6919-1970-52.11, JIS K 6919 being based on ASTM D 790-71.

Table 9

Bending strength and bending elasticity after heat-treatment at 200°C for 100 hours.

| Laminate No. | Bending Strength | | Bending Elasticity | |
|---|---|---|---|---|
| | (kg/mm$^2$) | retention (%) | (kg/mm$^2$) | retention (%) |
| 1 | 44.5 | 96 | 1674 | 95 |
| 2 | 41.1 | 91 | 1642 | 92 |
| 3 | 41.8 | 95 | 1711 | 91 |
| 4 | 31.7 | 78 | 1416 | 79 |
| 5 | 36.7 | 96 | 1660 | 92 |
| 6 | 41.7 | 87 | 1787 | 95 |
| 7 | 48.5 | 107 | 1872 | 106 |

Retention of bending strength is represented by the following:

strength after heat treatment/strength before heat treatment × 100

Retention of bending elasticity is similarly defined.

Table 10

Bending strength and bending elasticity after heat-treatment at 250°C for 100 hours.

| Laminate No. | Bending Strength | | Bending Elasticity | |
|---|---|---|---|---|
| | (kg/mm$^2$) | retention (%) | (kg/mm$^2$) | retention (%) |
| 1 | 45.7 | 98 | 1582 | 90 |
| 2 | 41.9 | 92 | 1601 | 90 |
| 3 | 46.1 | 105 | 1708 | 91 |
| 4 | 29.2 | 73 | 1302 | 73 |
| 5 | 35.4 | 92 | 1619 | 90 |
| 6 | 39.9 | 83 | 1762 | 93 |
| 7 | 46.3 | 102 | 1763 | 100 |

Table 11

Bending strength and bending elasticity under heat at 100°C

| Laminate No. | Bending Strength | | Bending Elasticity | |
|---|---|---|---|---|
| | (kg/mm$^2$) | retention (%) | (kg/mm$^2$) | retention (%) |
| 1 | 43.2 | 93 | 1801 | 102 |
| 2 | 35.2 | 79 | 1531 | 86 |
| 3 | 2.5 | 6 | 262 | 14 |
| 4 | 35.5 | 89 | 1655 | 93 |
| 5 | 38.1 | 99 | 1606 | 89 |
| 6 | 41.5 | 87 | 1828 | 98 |
| 7 | 42.7 | 94 | 1766 | 100 |

Retention of bending strength is represented by the following:

strength after heat treatment/strength before heat treatment × 100

Retention of bending elasticity is similarly defined.

Table 12

Bending strength and bending elasticity under heat at 150°C

| Laminate No. | Bending Strength | | Bending Elasticity | |
|---|---|---|---|---|
| | (kg/mm$^2$) | retention (%) | (kg/mm$^2$) | retention (%) |
| 1 | 29.5 | 63 | 1528 | 87 |
| 2 | 17.3 | 38 | 1025 | 58 |
| 3 | 1.8 | 4 | 246 | 13 |
| 4 | 15.2 | 38 | 1137 | 64 |
| 5 | 13.7 | 36 | 728 | 40 |
| 6 | 37.2 | 78 | 1568 | 84 |
| 7 | 33.2 | 73 | 1281 | 73 |

Following Examples 7 and 8 show that laminates prepared by using polyhydroxystyrene-epoxy resin composition impregnated substrates have excellent electrical properties.

EXAMPLE 7

38.8 parts by weight of polyparahydroxystyrene (average molecular weight: 6800), 61.2 parts by weight of an epoxy resin DER331-J and, as a hardener, 1 phr (parts per hundred resin) of p-dimethylaminobenzaldehyde were dissolved in 75 parts by weight of acetone to prepare a varnish. A glass cloth as described in Example 6 was immersed in the resulting varnish, left at room temperature (approx 20° to 30°C) for 12 hours and dried at 80°C for 10 minutes to obtain a resin composition impregnated substrate. Sheets of the resulting substrates were piled in three layers or six layers, heated at 120°C for 10 minutes and then subjected to heat-press molding at 120°C and 50 kg/cm² for 20 minutes to obtain laminates having a thickness of 0.8 mm and 1.6 mm, respectively. Next, the respective laminates were post-cured at 180°C for 2 hours.

Test pieces were cut from these laminates and the electrical properties thereof were measured. The results obtained are shown in Table 13. In Table 13, "Dielectric Breakdown Strength" row relates to the laminate of 0.8 mm thickness and "Insulating Resistance" row and the others relate to the other laminate of 1.6 mm thickness.

Table 13

| Property Tested | Temperature | | |
|---|---|---|---|
| | 20°C | 60°C | 120°C |
| Dielectric Breakdown Strength (KV/mm) | — | 36.7 | — |
| Insulating Resistance (Ω) | $0.8 \times 10^{15}$ | — | — |
| do. (boiling for 2 hours) | $1.0 \times 10^{9}$ | — | — |
| Surface Resistance (Ω) | $0.8 \times 10^{14}$ | $0.8 \times 10^{14}$ | $1.3 \times 10^{13}$ |
| do. (boiling for 2 hours) | $0.7 \times 10^{12}$ | — | — |
| Volume Resistivity (Ω-cm) | $0.6 \times 10^{15}$ | $3.5 \times 10^{13}$ | $5.9 \times 10^{11}$ |
| do. (boiling for 2 hours) | $1.2 \times 10^{13}$ | — | — |
| Dielectric Constant (1 MHz) | 5.2 | 5.4 | 5.5 |
| Dielectric Power Factor (1 MHz) | 0.028 | 0.018 | 0.010 |
| Arc Resistance (sec.) at RH 60% | 143 | — | — |
| Tracking Resistance at 25°C, RH40% | | grade: E3 | |

The tracking resistance was measured according to the following method which is modified from the KA method of DIN 53480 (1964):

A specimen was put on a supporting bed and a pair of electrodes were placed on the horizontal surface of the specimen with a distance between the electrodes of $4 \pm 0.1$ mm. The circuit voltage was so adjusted that the short circuit current therein was $1 \pm 0.1$A, and then 20–25mm³ of a test solution (±ammonium chloride aqueous solution of 0.100±0.002 percent concentration) were dropped on the surface of the specimen in a central part between the electrodes, at a rate of one drop per 30±5 seconds. A maximum depth of groove eroded on the surface of the specimen immediately after the dropping of 101 drops was measured with a micrometer, and the tracking resistance was graded according to following Table 14.

Table 14

| Tracking Resistance Grade | Drops | Maximum Depth of Eroded Groove (mm) |
|---|---|---|
| E1 | 101 | more than 2 |
| E2 | 101 | 1 – 2 |
| E3 | 101 | less than 1 |

EXAMPLE 8

20.0 parts of weight of polyhydroxystyrene (average molecular weight: 6800), 80.0 parts by weight of a solid epoxy resin Epikote 1001 (trade name, a resin prepared from epichloro-hydrin and bisphenol A, epoxy equivalent 480, produced by Shell Corp.) and, as a hardener, 0.5 phr of p-dimethylaminobenzaldehyde were dissolved in 110 parts by weight of acetone to obtain a varnish. A plain weave glass cloth (KS 1600/S-920L, produced by kanebo-Stevens Co.) was immersed in the resulting varnish, left at room temperature for 12 hours and then heat-treated at 140° to 160°C for 6 minutes to obtain a resin composition impregnated substrate. Sheets of the resulting substrates were piled up in three layers or 12 layers and then subjected to heat-press molding at 165°C and 50 kg/cm² for 15 minutes to obtain laminates having a thickness of 0.5 mm and 2.1 mm, respectively. Next, the respective laminates were post-cured in an oven at 165°C for 1 hour.

Test pieces were cut from these laminates and the electrical properties thereof were measured. The results obtained are shown in the following Table 15. In Table 15, the rows "Arc Resistance" and "Tracking Resistance" relate to the laminate of 2.1 mm thickness and the other rows relate to the other laminate of 0.5 mm thickness.

Table 15

| Properties Tested | Temperature | Data |
|---|---|---|
| Insulating Resistance (Ω) | 25°C | $10 \times 10^{12}$ or more |
| do. (boiling for 2 hours) | do. | $1.88 \times 10^{12}$ |
| Surface Resistance (Ω) | do. | $1.88 \times 10^{14}$ or more |
| do. (moisture absorption treatment for 96 hours) | do. | $1.56 \times 10^{14}$ |
| Volume Resistivity (Ω-cm) | do. | $3.3 \times 10^{14}$ |
| do. (moisture absorption treatment for 96 hours) | do. | $1.26 \times 10^{14}$ |
| do. (boiling for 2 hours) | do. | $4.2 \times 10^{13}$ |
| Dielectric Constant (1 MHz) | do. | 4.55 |
| do. (moisture absorption treatment for 48 hours) | do. | 4.34 |
| Dielectric Power Factor (1 MHz) | do. | $176 \times 10^{-4}$ |
| do. (moisture absorption treatment for 48 hours) | do. | $172 \times 10^{-4}$ |
| Arc Resistance (sec.) | do. | 182 |
| Tracking Resistance | do. | grade: E3 |

EXAMPLE 9

The following three kinds of resin compositions were used and one-surface or both-surface copper clad laminates were prepared. More precisely, the three kinds of epoxy resin component used were DER331-J, Epikote 154 (a resin consisting of a novolak and epichlorohydrin, produced by Shell Corp.) and CX221, and as the polyhydroxystyrene component was used a polyparahydroxystyrene having an average molecular weight of 3300. The polyhydroxystyrene component and the epoxide component are first weighed in the proportion as shown in Table 16 (where the ratio of —OH/Ep=1 in every case), and when Epikote 154 was used, 1 phr of p-dimethylaminobenzaldehyde was added as a hardening accelerator. These were dissolved in a specific amount of acetone to form a varnish. The same glass cloth as that used in Example 6 was immersed in each of the resulting varnishes, left at room temperature for 12 hours and then dried at 80°C for 10 minutes to prepare three kinds of impregnated substrates or prepreg clothes. Six pieces of these prepreg clothes were piled up, and on one surface of or both surfaces thereof was superposed a copper foil of a thickness of 35 $\mu$ (a copper foil CFT-3 for epoxy resin, produced by Fukuda Metal Foil and Powder Co., in which no adhesive was used), and thereafter these assemblies were subjected to heatpress molding under the conditions as shown in Table 16 to obtain a copper clad laminate of a thickness of 1.6 mm, which was then post-cured at 180°C for 2 hours.

Table 16

| Laminate No. | PHS | Resin Composition (wt.%) Epoxide | | Accelerator | Acetone (wt.%) |
|---|---|---|---|---|---|
| 1 | 38.8 | DER331-J | 61.2 | — | 75 |
| 2 | 40.1 | Epikote 154 | 59.9 | 1 phr | 100 |
| 3 | 46.7 | CX221 | 53.3 | — | 75 |

| Laminate No. | Heating and Pressing Conditions | Resin Content in Laminate (wt.%) |
|---|---|---|
| 1 | 180°C × 50 kg/cm² × 60 min | 35 |
| 2 | 120°C × 50 kg/cm² × 30 min | 40 |
| 3 | 180°C × 50 kg/cm² × 60 min | 35 |

Various properties of each of the resulting laminates were measured and the results obtained are shown in Table 17. In Table 17, the row "Solder Heat Resistance" relates to the both-surface copper clad laminates, and the row "Tear Strength in Perpendicular Direction" and the other rows relate to the one-surface copper clad laminates. With respect to the "Volume Resistivity", laminates from which copper foil(s) was (were) removed were subjected to the this testing.

The "Solder Heat Resistance" was measured using the following method according to JIS C 6481-1968:

Solder was put in a steel container to a depth of 50 mm, and the temperature of the molten solder was adjusted to a specific temperature. A test piece was floated on the surface of the solder so that the copper surface thereof faced the solder and that the entire surface was fully immersed in the solder, and after a specific period of time the test piece was picked up with a pair a tweezers and cooled to room temperature and then the occurrence of any blister or peeling in the surface of copper foil as well as the surface laminate is observed by the naked eye.

Table 17

| Laminate No. | 1 | 2 | 3 |
|---|---|---|---|
| Solder Heat Resistance (min.) (300°C) | 5 < | 30< | |
| Peeling Strength in Perpendicular Direction (kg/cm) | 1.52 5< | 1.53 | 1.67 |
| Peeling Strength in Perpendicular Direction After Solder Test (kg/cm) | 1.63 | 1.45 | 1.55 |
| Volume Resistivity ($\Omega$-cm) (boiling for 24 hours) | 5.0 × 10¹¹ | 5.7 × 10¹⁰ | 3.9 × 10¹¹ |

EXAMPLE 10

The same combination of polyhydroxystyrene and DER331-J as used for laminate No. 1 of Example 9 was used together with 1 phr of p-dimethylaminobenzaldehyde as a hardening accelerator, and a copper clad laminate was prepared therefrom in a manner similar to the preparation of laminate No. 2 of Example 9. Various properties of the resulting laminate were measured and the results obtained are shown in Table 18.

Table 18

| | |
|---|---|
| Solder Heat Resistance (min.) (260°C) | 30 < |
| Peeling Strength in Perpendicular Direction (kg/cm) | 1.63 |
| Peeling Strength in Perpendicular Direction after Solder Test (kg/cm) | 1.52 |
| Volume Resistivity ($\Omega$-cm) (after boiling for 24 hours) | 1.5 × 10¹⁰ |

EXAMPLE 11

38.8 parts by weight of polyparahydroxystyrene (average molecular weight: 9900), 61.2 parts by weight of DER331-J and 1phr of p-dimethylaminobenzaldehyde were used to prepare a resin composition, and a copper clad laminate was manufactured therefrom in a manner similar to laminate No. 2 of Example 9. Various properties of the resulting laminate were measured and the results obtained are shown in Table 19.

Table 19

| | |
|---|---|
| Solder Heat Resistance (min.) (260°C) | 30 < |
| Peeling Strength in Perpendicular Direction (kg/cm) | 1.73 |
| Peeling Strength in Perpendicular Direction after Solder Test (kg/cm) | 1.46 |

EXAMPLE 12

59 parts by weight of polyparahydroxystyrene (average molecular weight: 3300), 44 parts by weight of DER331-J and 1 phr of p-dimethylaminobenzaldehyde were used to prepare a resin composition, and a copper clad laminate was manufactured therefrom in a manner similar to the preparation of laminate No. 2 of Example 9. Various properties of the resulting clad laminate were measured and the results obtained are shown in Table 20.

Table 20

| | |
|---|---|
| Solder Heat Resistance (min.) (260°C) | 30 < |
| Tear Strength in Perpendicular Direction (kg/cm) | 1.63 |
| Tear Strength in Perpendicular Direction after Solder Test (kg/cm) | 1.47 |

EXAMPLE 13

20 parts by weight of polyparahydroxystyrene (average molecular weight: 4900), 80 parts by weight of the same epoxy resin Epikote 1001 (epoxy equivalent:480) as that used in Example 8 and 0.5 phr of p-dimethylaminobenzaldehyde were dissolved in 75 parts by weight of acetone to prepare a varnish. The same glass cloth as that used in Example 6 was immersed in the resulting varnish, left at room temperature for one night, and then dried at 80°C for 10 minutes to obtain a prepreg cloth. Five sheets of these prepreg cloths were piled up, and a copper foil (a copper foil TA 1 for epoxy resin, produced by Furukawa Circuit Foil Co.) was superposed on one surface or both surfaces of the piled cloths and then subjected to heat-pressure molding to obtain a both-surface copper clad laminate and a one-surface copper clad laminate. In this molding, the specimen was pressed for 20 minutes at 150°C and 50 kg/cm² and then post-cured for 2 hours at 170°C. In the laminates obtained, the solder heat resistance was measured on the both-surface copper clad laminate, and the peeling strength on the one-surface copper clad laminate. The results obtained are shown in Table 21.

Table 21

| | |
|---|---|
| Solder Heat Resistance (min.) (300°C) | 30 < |
| Peeling Strength in Perpendicular Direction (kg/cm) | 1.95 |
| Peeling Strength in Perpendicular Direction after Solder Test (kg/cm) | 1.75 |

EXAMPLE 14

20 parts by weight of polyparahydroxystyrene (average molecular weight: 4900), 80 parts by weight of the same solid epoxy resin Epikote 1001 as that used in Example 8 and 0.5 phr of p-dimethylaminobenzaldehyde were dissolved in 110 parts by weight of acetone to prepare a varnish. The same glass cloth as that used in the Example 8 was immersed in the resulting varnish, left at room temperature for one night and then dried at 80°C for 10 minutes to obtain Prepreg Cloth A.

On the other hand, 39 parts by weight of the above described polyparahydroxystyrene, 61 parts by weight of the above described epoxy resin and 0.5 phr of p-dimethylaminobenzaldehyde were dissolved in 75 parts by weight of acetone to form a varnish. By using the thus obtained varnish and in a manner similar to the preparation of the above Prepreg Cloth A, Prepreg Cloth B was obtained.

Next, seven sheets of the Prepreg Cloth B were piled up, and one sheet of the Prepreg Cloth A was then superposed on both surfaces of the piled sheets of Prepreg Cloth B, and in addition, the same copper foil as that used in Example 13 was further superposed on one surface thereof, and thereafter, the thus piled sheets were subjected to heat-pressure molding to obtain a one-surface copper clad laminatae.

In this molding, the specimen was pressed for 15 minutes at 165°C and 50 kg/cm², and then was post-cured for 45 minutes at 165°C.

The solder heat resistance and peeling strength were tested on the copper clad laminate obtained. After removal of the copper by etching, the bending strength was tested on the thus etched laminate. The results obtained of these tests are shown in the following Table 22.

Table 22

| | |
|---|---|
| Solder Heat Resistance (min.) (320°C) | 10< |
| Peeling Strength in Perpendicular Direction (kg/cm) | 1.90 |
| Peeling Strength in Perpendicular Direction after Solder Test (kg/cm) | 1.80 |
| Bending Strength at 25°C (kg/mm²) | 45.2 |
| Bending Strength at 150°C (kg/mm²) | 19.4 |

While the invention had been described in detail and with reference to specific embodiments thereof, it will be apparent to one skilled in the art that various changes and modifications can be made therein without departing from the spirit and scope thereof.

What is claimed is:

1. A thermosetting resin composition comprising a polyhydroxystyrene having a degree of polymerization of from 4 to 70,000 and an epoxy resin comprising an epoxy compound having at least 2 epoxy groups per molecule, wherein the ratio of the number of hydroxyl groups in said polyhydroxystyrene to the number of epoxy groups in said epoxy resin is in the range of 0.5 – 5.0.

2. The thermosetting resin composition as claimed in claim 1, wherein said polyhydroxystyrene has a degree of polymerization of from 4 to 150.

3. The thermosetting resin composition as claimed in claim 1, wherein said epoxy resin is selected from the group consisting of bisphenol type epoxy resins, novolak type epoxy resins, resole type epoxy resins, polyphenol type epoxy resins, polyhydroxybenzene type epoxy resins, polyglycol type epoxy resins, carboxylic acid type epoxy resins, cycloaliphatic epoxy resins, nitrogen-containing epoxy resins and diene type epoxy resins, and wherein said polyhydroxystyrene is a polymer of o-hydroxystyrene, m-hydroxystyrene, p-hydroxystyrene or mixtures thereof.

4. The thermosetting resin composition as claimed in claim 3, wherein said epoxy resin is a bisphenol type epoxy resin.

5. The thermosetting resin composition as claimed in claim 4, wherein said epoxy resin is comprises the reaction product of bisphenol A and epichlorohydrin.

6. The thermosetting resin composition as claimed in claim 3, wherein said epoxy resin is a novolak type epoxy resin.

7. The thermosetting resin composition as claimed in claim 6 wherein said epoxy resin is comprises the reaction product of a novolak and epichlorohydrin.

8. The thermosetting resin composition as claimed in claim 3, wherein said epoxy resin is a cycloaliphatic epoxy resin.

9. The thermosetting resin composition as claimed in claim 8, wherein said epoxy resin has the following formula:

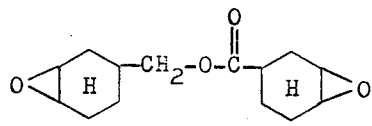

10. The thermosetting resin composition as claimed in claim 8, wherein said epoxy resin has the following formula:

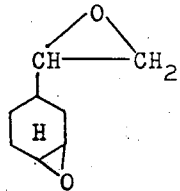

11. The thermosetting resin composition as claimed in claim 1, wherein said composition comprises an organic solvent solution of said polyhydroxystyrene and said epoxy resin.

12. The thermosetting resin composition as claimed in claim 1, wherein the ratio of the number of hydroxyl groups in said polyhydroxystyrene to the number of epoxy groups in said epoxy resin is in the range of 0.8 to 5.0.

13. The thermosetting resin composition as claimed in claim 1, wherein said composition contains at least one of a catalyst, a hardening accelerator, a dyestuff, a pigment, a plasticizer, a reinforcing agent or a filler.

14. The thermosetting resin composition as claimed in claim 13, wherein said hardening accelerator is p-dimethylamino-benzaldehyde.

15. The thermosetting resin composition as claimed in claim 11, wherein said composition contains at least one of a catalyst, a hardening accelerator, a dyestuff, a pigment, a plasticizer, a reinforcing agent and a filler.

16. A method for preparing a heat resistant hardened product comprising heating a thermosetting resin composition comprising a polyhydroxystyrene having a degree of polymerization of 4 to 70,000 and an epoxy resin having at least two epoxy groups per molecule, wherein the ratio of the number of hydroxyl groups in said polyhydroxystyrene to the number of epoxy groups in said epoxy resin is in the range of 0.5 to 5.0, at a temperature ranging from 150°C to below the decomposition temperature of said hardened product.

17. The method of claim 16 wherein the ratio of hydroxyl groups in said polyhydroxy styrene to the number of epoxy groups in said epoxy resin is in the range of 0.8 to 5.0

* * * * *